Nov. 6, 1951  T. C. BAKER  2,573,824
MACHINE FOR HIGH-FREQUENCY DETERMINATIONS OF WALL
THICKNESS OF BOTTLES AND THE LIKE
Filed Oct. 17, 1946  6 Sheets-Sheet 1

INVENTOR
THEODORE C. BAKER
BY Parham + Bates
ATTORNEYS

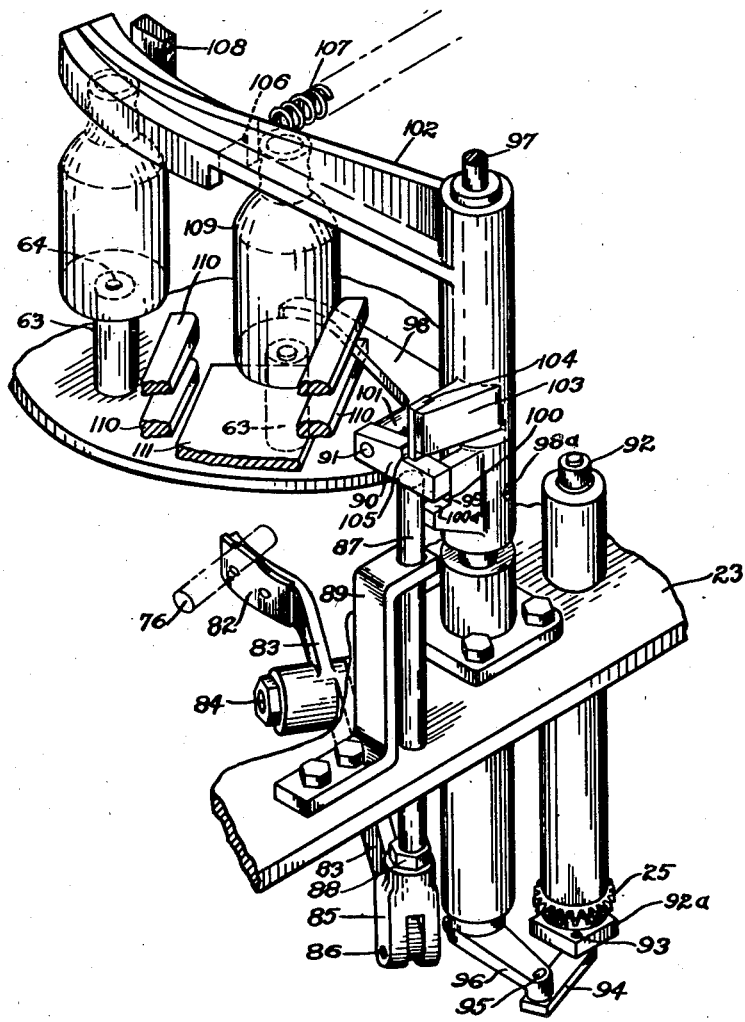

Nov. 6, 1951 T. C. BAKER 2,573,824
MACHINE FOR HIGH-FREQUENCY DETERMINATIONS OF WALL
THICKNESS OF BOTTLES AND THE LIKE
Filed Oct. 17, 1946 6 Sheets-Sheet 5
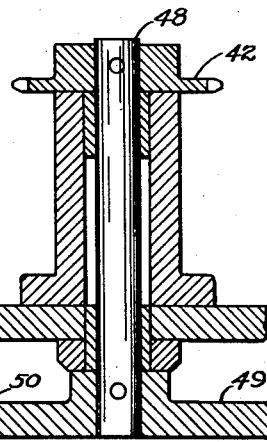
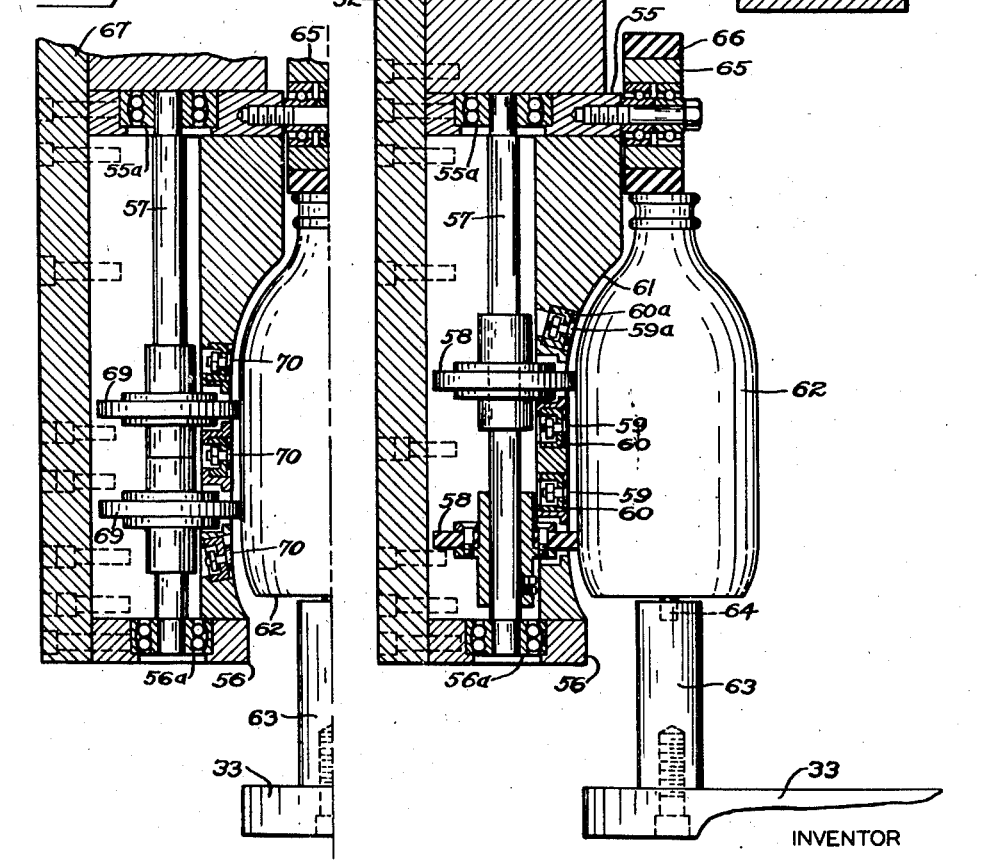
INVENTOR
THEODORE C. BAKER
BY *Parham + Bates*
ATTORNEYS

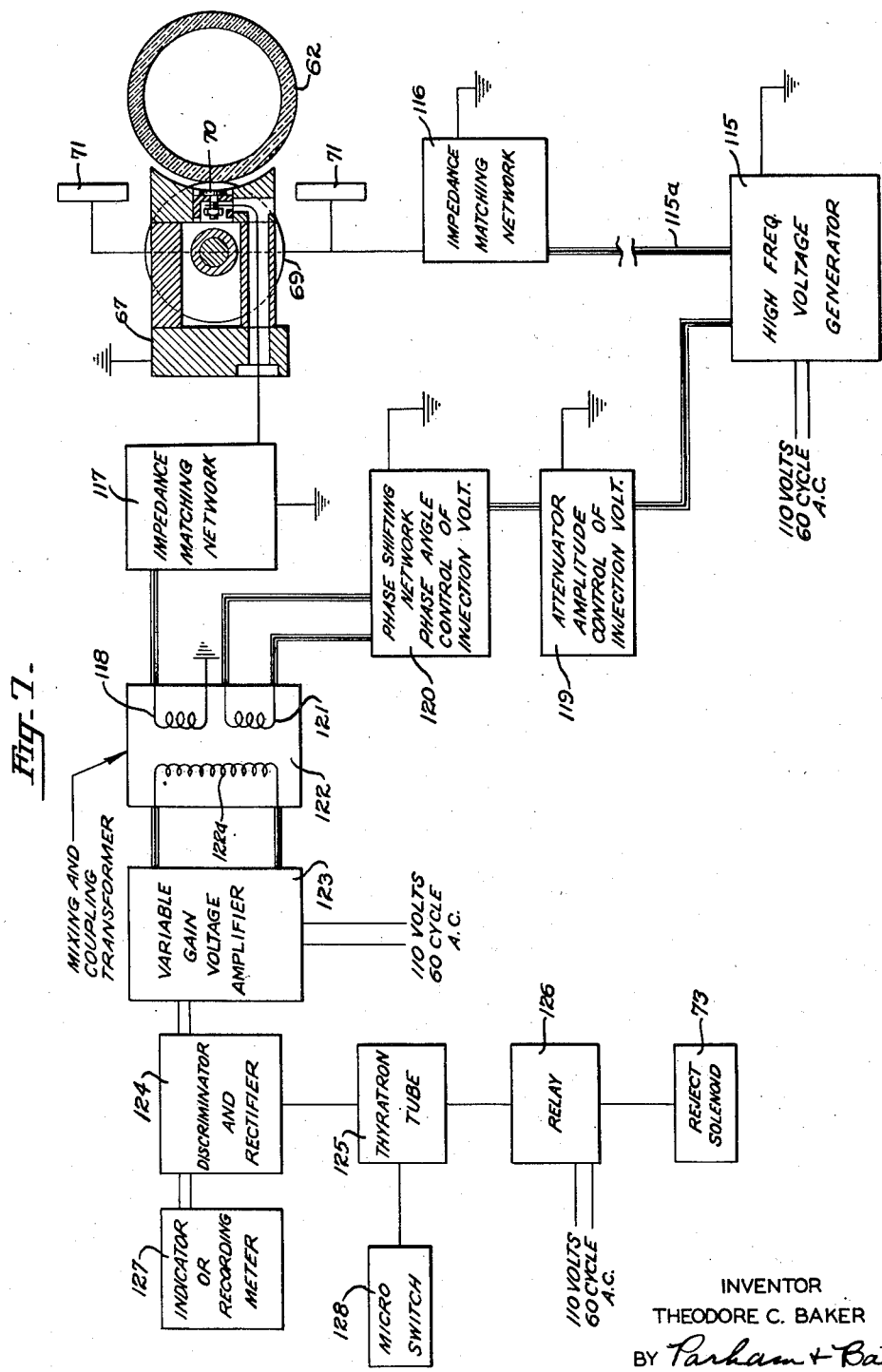

Patented Nov. 6, 1951

2,573,824

UNITED STATES PATENT OFFICE 2,573,824

MACHINE FOR HIGH-FREQUENCY DETERMINATIONS OF WALL THICKNESS OF BOTTLES AND THE LIKE

Theodore C. Baker, Perrysburg, Ohio, assignor to Emhart Manufacturing Company, a corporation of Delaware Application October 17, 1946, Serial No. 703,726

6 Claims. (Cl. 209—81)

1

This invention relates generally to improvements in the field of automatic inspection machinery for ascertaining the accuracy of certain dimensions of bottles, jars, and other containers made from dielectric materials.

The general object of this invention is to provide a fully automatic apparatus for positioning, inspecting, and segregating bottles, jars, and other articles according to their deviations of wall thickness from a predetermined standard. A more specific object of the present invention is to provide a mechanism that will automatically position bottles, jars, and other like articles for electrical inspection.

Another object of the present invention is to provide a rapid, accurate, convenient, and dependable electrical system for checking the wall thickness of bottles, jars and other like articles made from dielectric materials. A further object of the present invention is to provide an electrically operated system for automatically rejecting articles that are defective, as determined by the beforementioned electrical inspection system.

A variety of methods are known and being used by the manufacturers and packers of bottles and jars to detect defects in the wall structure of such articles. These methods comprise visual inspection, mechanical gauging of the wall with calipers or like instruments, and testing of the containers by impact means. These inspection methods are expensive, time consuming, and relatively inaccurate and are subject to the personal variations of the persons making such inspections.

Bottles and jars made by glassware forming machines often have defects, such as excessively thick and excessively thin side wall portions, resulting from uneven blowing operations, poor temperature distribution in the glass gobs, uneven initial contact of the gobs with the walls of the parison molds, or other malfunctioning of the feeding and forming equipment. By the use of the present invention, these defects can be automatically ascertained and the defective ware automatically rejected without the supervision or attention of any person. The method of operation and the attendant advantages of this invention will be apparent from the following description of the preferred embodiment which is disclosed with reference to the following drawings, in which:

Fig. 1 is the top plan view of the assembled machine showing bottles being fed in at one side thereof and acceptable bottles being discharged therefrom;

2

Fig. 4 is an enlarged perspective view of the rejection mechanism and also shows the interacting members that separate the defective or rejected bottles from the acceptable bottles;

Fig. 5 is a partial view of section 5—5 of Fig. 1, showing the details of the construction of one of the two electrical inspection heads;

Fig. 6 is a partial view of section 6—6 of Fig. 1, showing the details of construction of the other electrical inspection head; and Fig. 7 is a schematic drawing of the electrical system of the machine.

Generally speaking, the method of operation of this machine is to feed bottles individually from a succession of bottles into a rotating carrier which carries each bottle in its turn to a position in front of each of two inspection heads, at which time each inspection head is moved adjacent to each bottle to perform the inspection operation. While opposite each inspection head, the individual bottle is rotated about its axis, which is held vertical. The ascertainment of excessive deviations of the wall thickness of a bottle being inspected causes an electrical impulse which is transmitted to an electrical system which operates a mechanism to automatically reject the defective bottle at a later time. Acceptable bottles that meet the dimensional requirements as to wall thickness are discharged periodically at one side of the machine.

The specific manner in which the above generally described operations are accomplished can be understood from the following description of the details shown in the accompanying drawings.

Figure 2:
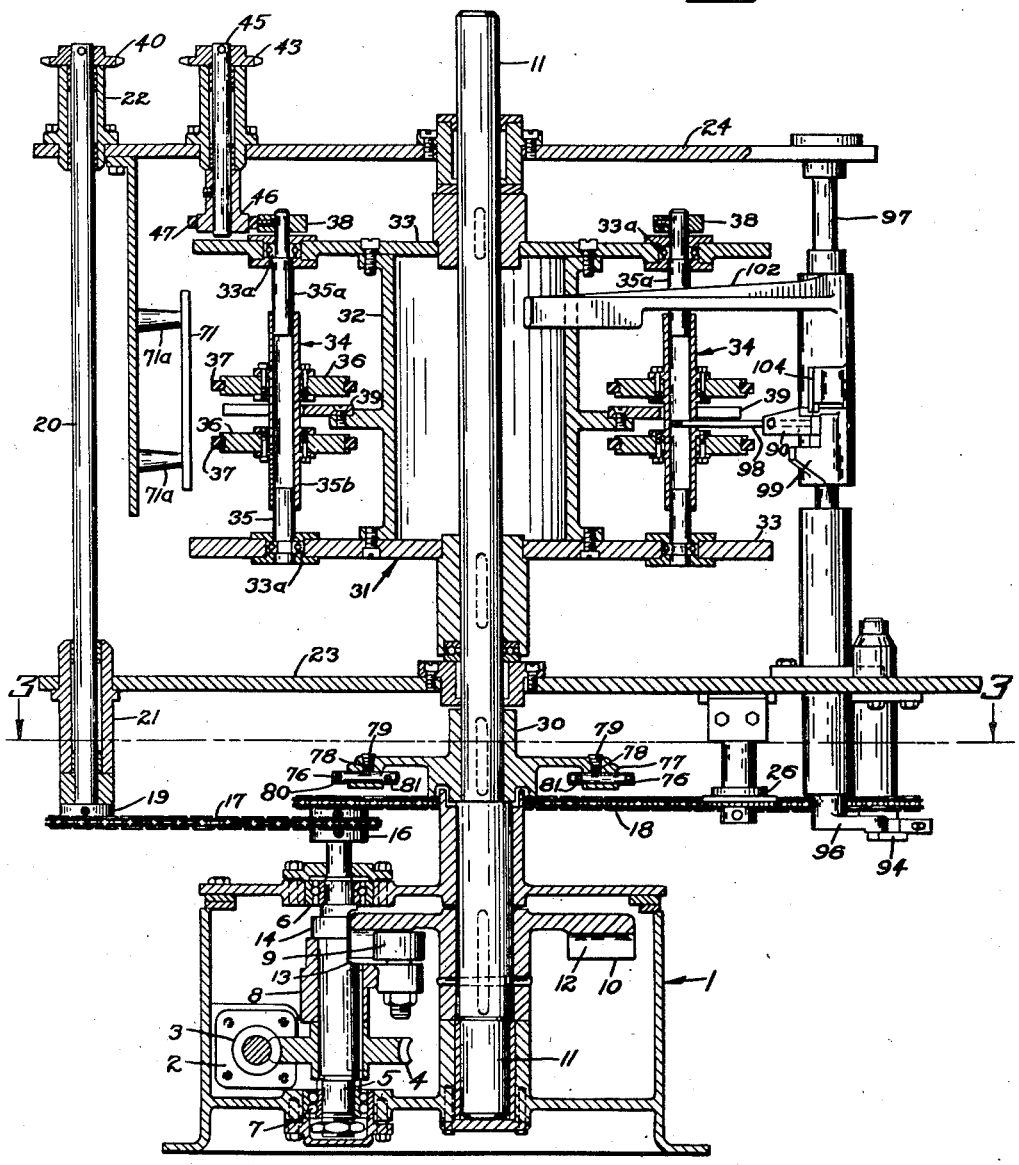
Fig. 2 is a view of section 2—2 of Fig. 1, showing the driving members and certain of the related parts thereof, certain elements of the complete apparatus being omitted and other elements being rotated out of their true locations to afford a better view of the parts shown.

Referring first to Fig. 2, all the driving members are enclosed within a housing which is generally designated 1. A driving motor 2 supplies continuous and uninterrupted rotation of a worm 3 which is engaged with a worm gear or wheel 4. Worm gear 4 is fixed to a vertical shaft 5 which is suitably supported in antifriction bearings 6 and 7. Fixed to shaft 5 is a Geneva driving hub 8 carrying a driving roller 9. A Geneva wheel 10 is fastened to a vertical indexing shaft 11 and is suitably located in cooperative relationship with roller 9 and driving hub 8 in the manner usual in conventional Geneva drives. Eight radial guide slots 12 (Fig. 3), having parallel sides, are formed in Geneva wheel 10. The interaction between the driving roller 9 and the guide slots indexes shaft 11 periodically to eight different positions per revolution of the shaft about its axis. A slot 13 is formed in one side of shaft 5 (Fig. 2) to permit passage of the periphery of Geneva wheel 10 during the indexing motion of the wheel. A shoulder 14 is formed on the circumference of shaft 5 and is positioned so as to engage semicylindrical recesses 15 (Fig. 3) in Geneva wheel 10 and thereby to hold wheel 10 in position between indexing movements. The upper extremity of shaft 5 carries a double sprocket 16 engaging roller chains 17 and 18. A sprocket 19 is driven by chain 17, the sprocket being mounted on a vertical shaft 20 which is suitably supported by bearings in housings 21 and 22 (Fig. 2). Shaft 20 is continuously rotated at the same rotational speed at which shaft 5 is rotated by motor 2. The rotation of shaft 20 at a speed equal to that of shaft 5 is accomplished by making the pitch diameter of sprocket 19 equal to the pitch diameter of the sprocket 16. Stationary, horizontal support plates 23 and 24 hold bearing housings 21 and 22, respectively, in proper spaced vertical relationship.

Chain 18 drives a sprocket 25 (Fig. 3), the chain engaging with an idler sprocket 26. A sprocket 27 (Fig. 3) which is fastened to a vertical feed shaft 28 also is driven by chain 18. Sprocket 25 has a pitch diameter equal to that of driving sprocket 16, sprocket 25 thereby having a rotational speed equal to that of sprocket 16.

Main support members 29 (Figs. 1 and 3) may be provided between the stationary support plates 23 and 24, Fig. 2.

Fixed to vertical indexing shaft 11, Fig. 2, is a carrier disc 30, the function of which will be described hereinafter. Attached to shaft 11 is a carrier, generally designated 31, formed of a central support member 32 and two horizontal, annular, flat flanges 33. Carried between flanges 33 are eight positioning assemblies, generally designated 34. Each assembly consists of vertical shaft members 35 and 35a suitably mounted in antifriction bearings 33a. Mounted on a tube 35b fixed to members 35 and 35a are two vertically spaced discs 36 made from "Micarta" or other dielectric material. Each disc 36 carries a soft rubber tire 37 on its peripheral surface. Disposed in the space between discs 36 is a flat annular insulating positioning plate 39 attached to central support member 32. A series of eight rectangular notches or recesses 39a are equally spaced about the periphery of plate 39, each notch being centrally disposed between the adjacent two positioning assemblies (see Fig. 1). A roller 38 is attached to the upper extremity of shaft 35a. Each positioning assembly is free to rotate in its bearings.

The cooperative action among notches 39a, positioning plate 39, and the positioning assemblies 34 is to retain the bottles in the proper angular position and to move them to the inspection positions. The rotation of the bottles when in the inspection position will be described hereinafter.

Figure 1:
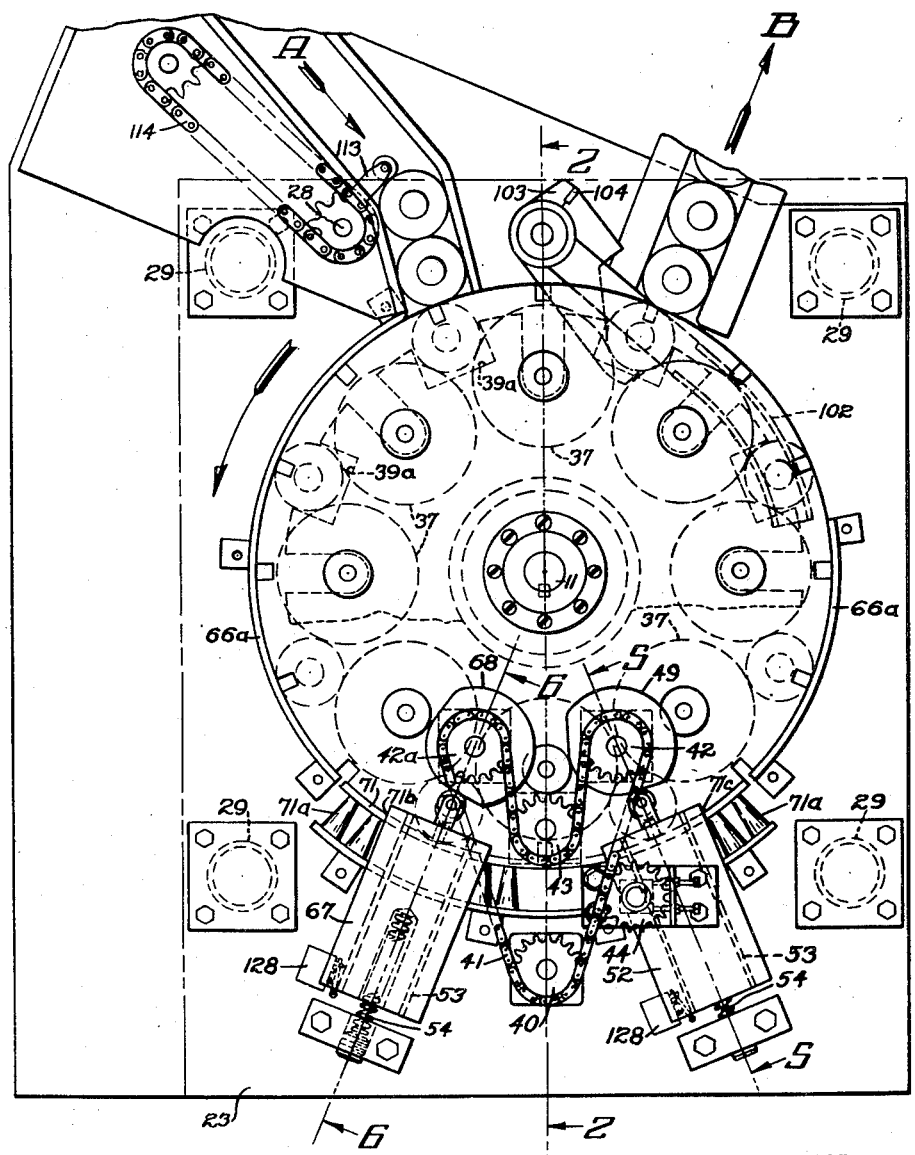

The upper extremity of shaft 20 carries a sprocket 40 which is pinned to shaft 20 and rotates continuously therewith. A roller chain 41 engages sprocket 40 and cam actuating sprockets 42 and 42a (Fig. 1). Chain 41 also engages a rotation sprocket 43 and an adjustable idler sprocket 44 which is used for adjusting the tension and taking up the slack of chain 41. Rotation sprocket 43 is pinned to a short vertical shaft 45 which has permanently attached to it an article rotation wheel 46 bearing a rubber tire 47 on its peripheral surface (Fig. 2). Shaft 45 is suitably positioned in bearings to bear a cooperative relationship to each positioning assembly 34 as it is indexed into operating position intermediately between the two inspection heads (Fig. 1). As each assembly is indexed into operating position by virtue of the before described Geneva motion, the periphery of roller 38 on the shaft 35a of that assembly comes into bearing contact with tire 47 of wheel 46. When each positioning assembly is so positioned, the rotation of shaft 20 is transmitted to vertical shaft 45 which, in turn, rotates the positioning assembly by means of the friction drive of rubber tire 47.

The cam actuating sprocket 42 is permanently attached to a vertical cam shaft 48, attached to the lower end of which is a cam 49 bearing in guiding relationship on a cam roller 50 (Fig. 5). Cam roller 50 is pinned by pin 51 to inspection head or housing 52. Housing 52 is guided for radial motion outwardly and inwardly from the center of indexing shaft 11 by parallel guides 53. A spring 54 bears on housing 52 and keeps roller 50 bearing in guiding contact on the lateral surface of cam 49. Bearing plates 55 and 56 (Fig. 5) are fixed to the housing 52 and carry antifriction bearings 55a and 56a, respectively, to suitably support a shaft 57. Attached to the shaft 57 are two insulating discs 58 in vertically spaced relationship. Spaced vertically between discs 58 are two capacitor pick up plates 59, mounted in insulating bushings 60. The bushings are, in turn, mounted in inspection head 52. Spaced above the upper Micarta disc 58 is an additional capacitor pick up plate 59a in an insulating bushing 60a. Side surface 61 of inspection head 52 is formed to define a contour which approximates in shape the outside contour of a bottle 62 being inspected. Capacitor pick up plates 59 and 59a are mounted flush with surface 61. Bottle 62 is held in spaced relationship to the capacitor pick up plates by the peripheral surfaces of Micarta discs 58. A steel post 63 is attached to lower flange 33 directly below each rectangular notch 39a in the periphery of member 39. Each steel post has a steel bearing pin 64 inserted in it to provide a bearing contact of small area for the bottom surface of the bottle to rest upon while it is being indexed by carrier 31. A positioning roller 65, carrying rubber tire 66, is spaced vertically above pin 64 to maintain bottle 62 in contact with pin 64 and to permit rotation of the bottle about its axis. A retaining wall 66a (Fig. 1) is formed along part of the arc of action defined by movement of carrier 31 to prevent bottles from toppling outwardly off of pins 64 when the bottles are being indexed to and from the inspection heads.

The second inspection head 67 (Fig. 6) is constructed in a manner similar to that of 52 and is guided in its radial motion by cam 68 (Fig. 1). Cam 68 is driven by cam sprocket 42a in a manner identical to that hereinbefore described with reference to inspection head 52. Two Micarta discs 69 are vertically spaced and separate three capacitor pick up plates 70. The combined effect of capacitor plates 70, 59 and 59a is to sweep a major portion of the side wall surface of the bottle being tested during a cycle of relative rotation about the vertical axis of the bottle, as will be described hereinafter.

Inspection heads 52 and 67 are angularly positioned so that there will be a bottle at each inspection head after each indexing movement of the bottle carrier. A positioning assembly 34 then will be intermediately spaced between the inspection heads with roller 38 of the positioning assembly in driven contact with the rubber-tired wheel 46, as shown in Fig. 2. As the central carrier 31 is periodically indexed by the action of Geneva wheel 10, a new bottle will be brought into position to be inspected by inspection head 67, and the bottle that was previously at inspection head 67 will be shifted to the inspection position in front of inspection head 52. Correspondingly, a different positioning assembly 34 will be brought into bearing contact with the rubber tire 47 of article rotator wheel 46. Through this action, the bottles being inspected will successively be passed to and inspected by each inspection head and each will be rotated for complete inspection of the peripheral wall of its body by means of the rotation of the positioning assemblies 34 as driven by shaft 45 and its associated parts. In timed relationship, cams 49 and 68 will guide inspection heads 52 and 67, respectively, so that the inspection heads will approach and recede from the bottles being inspected in proper timed sequence.

Main capacitor plate 71 is of substantial vertical extent and is formed arcuately adjacent to the periphery of carrier 31 and is supported by a plurality of insulating mounts 71a. The vertical extent of this main capacitor plate exceeds the height of the bottle being inspected by an amount sufficient to insure a uniform field distribution. This main capacitor plate extends arcuately on both sides of the inspection heads and has openings or slots 71b and 71c, respectively, opposite inspection heads 67 and 52 to permit their passage therethrough in the course of the radial movements of such heads. The main capacitor plate supplies the electrostatic field which is distorted by the passage therethrough of the dielectric material of the bottle being tested. The distortion of this field by the presence of the dielectric material of the bottle changes the capacitance between each capacitor pick up plate and the main capacitor plate. Insulating discs 58 and 69 act primarily as positioning rollers. "Micarta" or other suitable insulating material is used to minimize or obviate any extraneous attendant distortion of the electrostatic field produced by the main capacitor plate. The metal walls of the inspection heads provide shielding for the capacitor pick up plates.

Figure 3:
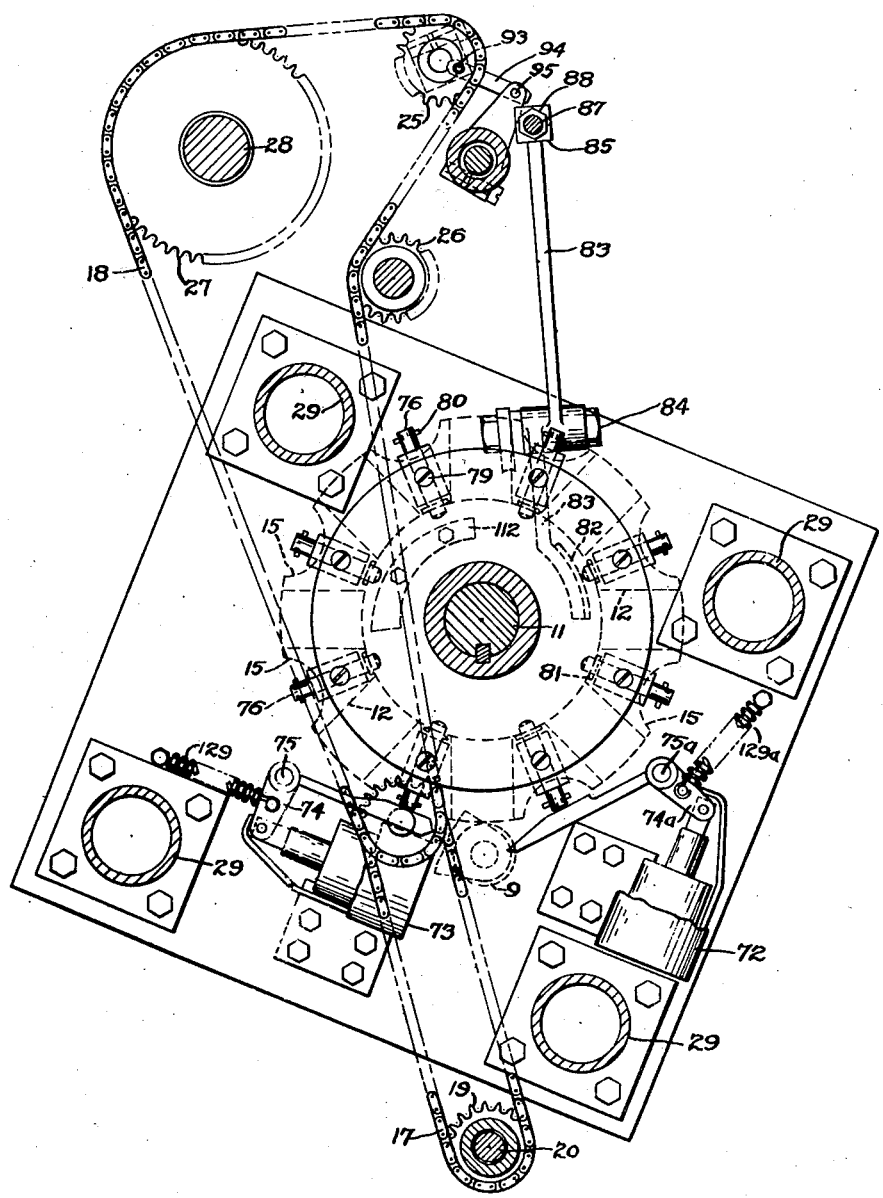
Fig. 3 is a plan view of a section of part of the machine on line 3—3, Fig. 2, showing in relatively large proportion the cooperative driving members, the drive for the rejection mechanism, and certain driven members.

Associated with the inspection heads 52 and 67 are solenoids 72 and 73, respectively (Fig. 3). These solenoids are of conventional type that will draw a central movable member within the coil thereof when the coil is energized by an electrical current of suitable magnitude. Connected to the ends of the movable members of the solenoids are ends of bell cranks 74 and 74a. These bell cranks are pivoted on stationary, permanently mounted, vertical pins 75 and 75a, respectively. The other end of each bell crank is disposed in working relationship to the outer ends of rejection pins 76 which are eight in number (Figs. 2 and 3). These rejection pins are equally spaced and are mounted angularly in the rim portion 77 of the carrier disc 30 (Fig. 2).

Located in disc 30 above each rejection pin is a spring 78 held in place by a tapered, threaded plug 79. The spring is compressed so as to bear on the plug and on the surface of the rejection pin so as to provide a drag which will resist the motion of the rejection pin in member 30. Transversely mounted in the outer end of each rejection pin is a limit pin 80 and transversely mounted on the inner end of each rejection pin is a limit pin 81. The sole function of limit pins 80 and 81 is to restrict the extent of radial motion inwardly and outwardly, respectively, of rejection pin 76 in rim 77 of carrier disc 30.

When a bottle whose wall thickness is above or below the predetermined standard is rotated in the electrostatic field produced by the main capacitor plate, the inspection head which detects this deviation transmits an impulse to a hereinafter described electronic circuit which, in turn, energizes the solenoid which is electrically associated with the inspection head. The energizing of the solenoid causes the central movable member to move inwardly, thereby rotating bell crank 74 (or 74a) on its pivot pin 75 (or 75a) and swinging the opposite end of the bell crank, thereby forcing rejection pin 76, which corresponds in its angular location to the defective bottle being inspected, inwardly to the limit permitted by limit pin 80. The inwardly displaced rejection pin will be correspondingly indexed in its angular location along with the defective bottle until the inner end of the rejection pin comes into bearing contact with a rejection cam 82 which is permanently mounted on a lever 83 (Fig. 4). Lever 83 is intermediately pivoted about a horizontal pivot pin 84. A clevis 85 is pivotally attached to the end of lever 83 by a pin 86. A vertical push rod 87 is carried by the clevis 85 and may be locked thereto by nut 88. Push rod 87 is guided for vertical movement by the stationary support plate 23 and a suitably disposed stationary bracket 89 which is secured to support plate 23. Latch 90 is pivoted about a horizontal pin 91 and rests on the upper end of push rod 87. The action of latch 90 will be described presently. Sprocket 25 which is driven with continuous rotation by roller chain 18 is mounted on a vertical shaft 92. A vertical pin 93 is attached to block 92a and is eccentrically located relative to axis of shaft 92. Block 92a may be made integrally with shaft 92 or may be an independent unit secured thereto. A link 94 is connected to block 92a by pin 93 and is connected by a vertical pin 95 to a lever 96 which is attached to the lower end of vertical shaft 97. Acceptance lever 98 is secured to shaft 97 by means of a set screw 98a. A projection 99 from one side of the acceptance lever has mutually perpendicular guiding faces 100 and 100a, respectively, which guide the movement of latch 90. A second projection 101 is provided on the side of acceptance lever 98. Pivot pin 91 is permanently secured in projection 101 and extends laterally therefrom to support in swingable disposition latch 90. A rejection lever 102 is pivotally mounted on shaft 97 but is not attached thereto. Rejection lever 102 has a projection 103 therefrom and a latch plate or pawl 104 permanently mounted thereon. The lower end of latch plate 104 projects downward in cooperative relationship with face 105 of latch 90. Face 105 is brought into working disposition with the lower end of plate 104 when the latch 90 is raised by push rod 87. The end portion of rejection lever 102 has an open-ended groove 106 in its lower surface into which the upper end or neck portion of each bottle is moved as such bottle nears a reject station during its travel about the center line of indexing shaft 11. A tension spring 107 holds rejection lever 102 against stop 108. As acceptable bottles are indexed about the center line of shaft 11, the neck portions pass through groove 106 and are then indexed to correspond in location to the entrance of acceptance chute B (shown in Fig. 1). Periodically, acceptance lever 98 pivots about shaft 97 under the action of crank 96 and link 94 and positions the acceptable bottle 109 between guide bars 110 onto the bottom surface 111 of the acceptance chute, Fig. 4. The acceptance chute B conveys the acceptable bottles to a moving conveyor or other suitable means (not shown) for conveying the bottles to a filling machine or other destination. If a defective bottle should come before inspection heads 52 and 67, rejection pin 76, which corresponds in angular position to the defective bottle, will be forced inwardly as has been described heretofore. As the defective bottle continues to be indexed, its corresponding rejection pin 76 will come into bearing contact with cam 82 thereby pivoting lever 83, which, in turn, raises push rod 87 thereby raising latch 90 and bringing surface 105 into working relationship with latch plate 104. During the next periodic oscillation of shaft 97, face 105 will come into bearing contact with the extension of latch plate 104 and will thereby rotate rejection lever 102, overcoming the force of spring 107. This sequence of actions will cause rejection arm 102 to swing outwardly, thereby throwing the defective bottle outwardly from the machine to fall into a cullet bin or other suitable container. It is to be noted that the rejection arm discards defective bottles from the indexed position immediately prior to and adjacent to the entrance to the acceptance chute.

After the rejection of the defective bottle, the rejection pin 76 runs over the end of cam 82. The weight of push rod 87 and clevis 85 causes lever 83 to rotate on its pivot pin 84, thereby lowering push rod 87 and releasing face 105 of latch 90 from its engaging relationship with the end of plate 104. The tension spring 107 will thereafter return rejection arm 102 to its inactive position bearing against stop 108. The inwardly displaced rejection pin 76 will continue to be indexed about the center of shaft 11 until the innermost end thereof comes into bearing contact with a stationary cam track 112 (Fig. 3) which is stationarily mounted within the rim portion of disc 30. As pin 76 slides along the face of cam track 112, the pin is gradually returned to its original outwardly extending position. The pin is now in position to go through the same cycle over again and to reject or permit acceptance of another bottle which is fed into the machine at the corresponding angular position from entrance chute A (Fig. 1). The bottles are fed into the machine from chute A by means of driving lugs 113 which are mounted on feed chain 114 (Fig. 1). This feed chain is driven continuously and at the proper relative speed by feed shaft 28 which is rotated by the continuously moving chain 18.

The electronic system which acts cooperatively with the mechanical system to separate the defective from the acceptable bottles is shown schematically in Fig. 7, conventional parts being shown diagrammatically. Referring to Fig. 7, a high frequency voltage generator 115 energizes the main capacitor plate 71 at a suitable frequency. For the particular embodiment disclosed, a value of approximately three megacycles per second is sufficient. An impedance matching network 116 matches the impedance of condenser plate 71 with the line 115a so that energy can be transmitted through the system with a minimum of losses. An alternating potential of approximately 400 volts maximum value preferably is created at plate 71 although it is possible to use a wide range of voltages satisfactorily. A pickup plate 70 (or any one of pickup plates 59 or 59a) is connected to a second impedance matching network 117 which in turn is connected to a pickup voltage coil 118, one side of the coil being grounded. Impedance matching network 117 facilitates transmission of energy from pickup plate 70 to pickup coil 118 with a minimum of losses in a similar fashion to that of impedance network 116. A high frequency voltage of approximately three megacycles per second is transmitted from the high frequency generator 115 to an attenuator 119, the function of which will be described presently. Connected to the attenuator is a phase shifting network 120 which is connected to an injection voltage coil 121. Injection voltage coil 121 and pickup coil 118 form part of a mixing and coupling transformer 122.

Attenuator 119 makes it possible to control the amplitude of the injection voltage going from the high frequency voltage generator to coil 121. The phase shifting network 120 permits shifting of the phase angle of the high frequency voltage relative to the time reference axis. A second coil 122a of the mixing and coupling transformer is connected to a variable gain voltage amplifier 123. The amplifier, in turn, is connected to a discriminator and rectifier 124. Connected to the rectifier is a thyratron 125 which controls the flow of current to relay 126 which, in turn, controls the flow of line current to the beforementioned rejection solenoid 73 (or 72). An indicator on recording meter 127 may be connected, if desired, to the circuit of rectifier 124.

The operation of the circuit is as follows. High frequency voltage generator 115 feeds through the impedance matching network 116 to produce an alternating high frequency potential on plate 71. Plate 71 and pickup plate 70 form a capacitor, the capacitance of which varies with the dielectric constant and the thickness of the material imposed in the electrostatic field between plates 71 and 70. Plate 71 produces an electrostatic field in space in the usual well-known manner. The electrostatic lines of force in space tend to repulse one another and turn towards the concentrated area of pickup plate 70. For this reason, the pickup plates should be spaced at the same distance from each portion of the adjacent main capacitor plate. The capacitor action between plates 70 and 71 produce an alternating high frequency voltage in plate 70 which is proportionately increased as materials, having higher dielectric constants or having larger cross-sectional areas for concentration of the lines of force, are interposed between the plates. The potential of plate 70 is fed through impedance matching network 117 to pickup voltage coil 118. An alternating potential of the same frequency as that in coil 118 and having equal amplitude but having 180° shift in phase angle can be produced in coil 121 by means of the attenuator 119 and the phase shifting network 120, respectively. When the circuit is so adjusted, no voltage will be induced in coil 122a of the mixing and coupling transformer 122.

Control of the amplitude and phase of the potential of coil 121 is used to produce the zero or reference setting of the electrical system. Thus, a bottle of the mean preferred wall thickness is placed in the inspection position before plate 70; the amplitude and phase angle of the potential being fed into coil 121 are adjusted by attenuator 119 and phase shifting network 120, respectively, until no potential is induced in coil 122a. When adjusted as described, the circuit will be unbalanced by anything that tends to increase or decrease the capacitance of the capacitor formed by plates 70 and 71. Thus, if a bottle having a wall thickness in excess of the mean preferred thickness is placed in position before the pickup 70, capacitance of the aforementioned capacitor will be increased and a higher voltage will be produced on plate 70. Conversely, a bottle having a wall thickness less than the mean preferred thickness will decrease the capacitance of the capacitor and will produce a correspondingly lower potential in plate 70. If bottle 62 is removed altogether from the field produced by plate 71, there will be a drastic drop in the voltage of plate 70, since the dielectric constant for air is 1.00, whereas the dielectric constant for glass is approximately 5 to 9.

Any of the before-described variations of the capacitor, formed by plates 70 and 71, different from the conditions existing when a bottle of the mean preferred thickness is in position before plate 70 will produce an unbalance between coils 118 and 121 and will thereby induce a voltage in coil 122a. The induced voltage under normal conditions will not be of sufficient magnitude to operate ordinary indicating and rejection circuits. Therefore, the induced voltage is amplified in magnitude by voltage amplifier 123. The amplified voltage is fed into a full wave rectifier which, in turn, provides a proportionate direct potential to the grid of thyratron 125. The thyratron circuit is adjusted so that an unbalance in the mixing and coupling transformer 122 in excess of a certain magnitude will fire the thyratron and permit flow of current to relay 126. When relay 126 closes, alternating line current is fed to rejection solenoid 73 (or 72), which, in turn, sets rejection pin 76 in the manner hereinbefore described.

For a quantitative evaluation of the magnitude of deviations in the wall thicknesses of the bottle being measured, an indicator of any suitable type may be connected to the rectifier as shown in 127.

Once the thyratron tube has fired, it will permit a continuous flow of current until reset. The resetting of thyratron 125 is accomplished by a micro-switch 128 which is mounted on stationary support plate 23 (Figs. 1 and 2) and which is actuated by the radial movement inwardly and outwardly of inspection head 67 (or 52). As the inspection head is forced outwardly by cam 68 after the inspection operation, the normally closed micro-switch 128 will be opened and the flow of current to the plate of the thyratron will be interrupted. The operation of the micro-switch in response to movements of the inspection head accomplishes a dual purpose; namely, it resets thyratron 125 after each rejection impulse and also prevents a false operation of the thyratron tube during the period when a bottle is not present before the pickup plate but is being indexed to position by the indexing apparatus.

The interruption of the current from the thyratron tube to the relay breaks the circuit to the rejection solenoid 73 (or 72). As soon as solenoid 73 is de-energized, bell crank 74 (or 74a) swings to its neutral position under the action of tension spring 129 (or 129a), Fig. 3.

Thus, in general terms, the operation of the electrical system is such that, when properly adjusted, any variation of the capacitance of the capacitor, formed by plates 70 and 71, from the capacitance that it has when a bottle of the mean preferred wall thickness is in inspection position causes an unbalance in the electrical system. The unbalance is used to fire a thyratron which, in turn, controls a relay feeding current to a rejection solenoid. The sensitivity of this system can be controlled by changing the degree of amplification in the voltage amplifier of the unbalance produced in the mixing transformer. This factor can be utilized to permit the passage of bottles through the inspection machine without rejection even though the bottles have a certain predetermined degree of varation from the mean preferred wall thickness.

It is recognized that the edge effects of plate 71 introduce a certain degree of error in the operation of this system. However, these effects have been found to be negligible. Because of the relatively small area of pickup plate 70, the effect of this system is to measure a localized region in the bottle wall immediately in front of the pickup plate 70.

Only one voltage generator 115 and one impedance matching network 116 are required to energize main capacitor plate 71. The three pickup plates of each inspection head can be used to operate one rejection solenoid. The remainder of the described electronic system must be supplied for each pickup plate of both inspection heads.

A series of experiments with the before-mentioned electrical system has shown that for the disclosed geometry of the capacitor plates, the optimum air gap between the external wall surface of the bottle and the face of the capacitor pickup plate is approximately one-eighth of an inch. With this air gap spacing, the maximum capacitance will result from a given bottle, and the functioning of the electrical system will be relatively insensitive to small deviations of the bottle from the proper inspection position.

The experiments have further shown that pickup plates having diameters ranging from one-eighth inch to an inch are satisfactory for the operation described. The diametral clearance between the pickup plates and the shielding wall structure of the inspection head has been held to one-sixteenth to one-eighth of an inch with satisfactory results. Pickup plates and associated parts of dimensions and configurations other than those shown and described herein may be used. However, having established fixed dimensions for any factors influencing the capacitance of the capacitor system, the other dimensions of the system should bear a definite relationship to the fixed dimensions for best results.

In review and summary, the general operation of the machine is as follows. A continuous stream of bottles to be inspected may be supplied to chute A. Driving lugs 113 on chain 114 periodically feed the bottles individually into the inspection machine. Each bottle is forced inwardly towards the center of the machine until it resides in a rectangular notch or recess 39a of plate 39 and rests against tires 37 of discs 36 of positioning assemblies 34. Each bottle is indexed periodically by movement of its carrier until it comes to the first inspection head 67 at which position the inspection head moves inwardly into inspecting position. The bottle is rotated by means of tire 47 and a positioning assembly adjacent to the bottle. As the bottle rotates in front of the inspection head, it is held in spaced relationship therewith by discs 69. Condenser pickup plates 70 sweep a limited annular region around the circumference of the bottle. The inspection head then moves outwardly under the action of cam 68 and the bottle is indexed to the second rejection head 52 which, in turn, moves inwardly into inspection position under the guidance of cam 49. Again the bottle is rotated about its axis by means of the positioning assembly which is in working disposition to tire 47 of wheel 46. Capacitor pickup plates 59 and 59a sweep a different alternate circumferential region of the bottle not covered by the capacitor pickup plates of the first inspection head. If the bottle is within permissible tolerances of wall thickness, it will continue to be indexed about shaft 11, the neck portion of the bottle eventually engaging in the groove 106 of rejection lever 102. The bottle neck will completely pass through groove 106 and come into position before guide bars 110. At that time, acceptance arm 98 will move in proper time sequence to gently push the acceptable bottle off of its steel bearing pin 64 onto the surface of the acceptance chute B. If a defective bottle with a wall thickness not within the permissible tolerances should come before the inspection head 52 or 67, it will effect the capacitance of main capacitor plate and the capacitor pickup plates so as to activate the electronic circuit and energize either or both solenoids 72 or 73. Bell crank 74 (and/or 74a) will thereby be swung about pivot pin 75 (and/or 75a) and force the corresponding rejection pin 76 inwardly. The rejection pin 76 will bear a certain angular relationship to the defective bottle and will retain that angular relationship until the bottle is rejected. The inwardly displaced rejection pin 76 engages with rejection cam 82, thereby raising push rod 87 and engaging face 105 of dog 90 with the latch plate 104 of the rejection lever 102. On the next periodical oscillation of acceptance arm 98 under the action of eccentric pin 93, face 105 will come into bearing contact with the lower end of latch 104, thereby rejecting the defective bottle by swinging arm 102 outwardly from the center of the machine. The inwardly displaced rejection pin is properly spaced angularly so that rejection arm 102 swings outwardly at the time the neck portion of the defective bottle is engaged in slot 106. The defective bottle having been rejected, inwardly displaced rejection pin 76 rides over the end of rejection cam 82 permitting push rod 87 and latch 90 to lower under their own weights, thereby permitting the return of the rejection lever 102 to its inactive position against stop 108 under the action of spring 107. Inwardly displaced rejection pin 76 will continue to be indexed about the center of shaft 11 until it is returned to its outermost position by bearing against the surface of cam tract 112.

If a rejection pin 76 is not displaced inwardly by the solenoid 72 or 73, it will completely bypass rejection cam 82 and will not impart any action to the rejection mechanism.

It is to be noted that the units of the electrical system should be well shielded and that coaxial cables should be used as indicated symbolically in Fig. 7.

Many modifications and alterations of the elements of this invention will be apparent to those skilled in the art after reading the foregoing disclosure. It is desired that the present specifications be construed as broadly as possible in light of the prior art to encompass such modifications within the spirit and scope of the appended claims.

I claim:

1. In combination, a main capacitor plate having an aperture therein, an inspection head formed to pass through said aperture into inspecting position adjacent to an inspection station for a jar, bottle, or like article, means for conveying successive articles to and away from said inspection station, a plurality of spaced capacitor pickup plates mounted on, insulated from, and shielded by said inspection head, means to position said inspection head in said inspecting position relative to said article, electrical means associated with said main capacitor plate to establish a high frequency electrostatic field through the wall of said article, tuned electrical means associated with said pickup plates responsive to changes of mutual capacitance between said pickup plates and said main plate caused by variation of wall thickness of said article from a predetermined standard, and normally inactive rejection means activated by said second electrical system to separate defective articles from acceptable articles.

2. In combination, an arcuate main capacitor plate having an aperture therein, an inspection head having a face contoured to simulate the external shape of an article being inspected and formed to pass through said aperture of said main plate to an inspecting position relative to an inspection station, means for conveying successive articles to and away from said inspection station, a plurality of spaced pickup plates mounted on, insulated from, and shielded by said inspection head and centrally located within said aperture flush with said contoured face, means to position said inspection head at its inspecting position relative to an article at the inspection station, electrical means associated with said main capacitor plate to establish a high frequency electrostatic field through the wall of said article, tuned electrical means associated with said pickup plates responsive to changes of mutual capacitance between said pickup plates and said main plate caused by variations of wall thickness of said article from a predetermined standard, and normally inactive rejection means activated by said electrical system to separate defective articles from acceptable articles.

3. In combination, a plurality of inspection heads, each having one face formed to simulate the contour of an article being inspected, a plurality of recesses vertically spaced in said contoured face of each inspection head, a plurality of shielded and insulated capacitor pickup plates mounted in said recesses flush with said contoured face and located so as to sweep a major portion of the wall of said article during rotation of said article before said inspection heads, a main capacitor plate arcuately formed between the contoured faces of the inspection heads and having apertures for said inspection heads to pass through, means for presenting and rotating said article in turn before each inspection head, means for maintaining said article in spaced relationship with said inspection heads, electrical means associated with said main capacitor plate and said pickup plates to provide an electrostatic field therebetween, electrical means responsive to changes in capacitance of said main plate and pickup plates caused by variations in wall thickness of said article from a predetermined standard, normally inactive rejection means activated by said second named electrical means to separate defective from acceptable articles.

4. Apparatus as defined in claim 3 wherein said pickup plates are circular in configuration and between one-eighth inch and one inch in diameter and are spaced radially from said inspection head by one-thirty-second to one-sixteenth of an inch.

5. In an apparatus for automatically detecting and rejecting jars, bottles, and like articles having excessive variations of wall thickness, a carrier mounted for intermittent indexing about a vertical axis, said carrier having a plurality of angularly spaced notches around the periphery thereof, a plurality of positioning roller assemblies angularly disposed adjacent to said notches, support pins located on said carrier corresponding in position to said notches, said positioning assemblies, notches and support pins being formed to retain said articles for indexing about said axis, a plurality of inspection heads, a plurality of cam mechanisms to move said inspection heads radially inwardly and outwardly from said carrier to bring said heads periodically into inspecting position adjacent to said articles, means associated with said positioning assemblies to rotate said articles about the axis of the latter when in inspection position before each inspection head, means for holding said inspection heads in spaced relationship to said articles during inspection, electrical means responsive to variations of wall thickness of said articles detected by said inspection heads, normally inoperative rejection means associated with said electrical means to reject articles ascertained to be defective by said inspection heads, microswitches operated by the radial movements of said inspection heads to prevent improper operation of said rejection means during indexing of said article and to reset the electrical means after each rejection cycle, and continuously operating acceptance means to eject acceptable articles on to a delivery chute.

6. In combination, an inspection head having one face formed to simulate the outer contour of a generally cylindrical article being inspected, a plurality of recesses spaced in said contoured face of said inspection head, a plurality of shielded and insulated capacitor pickup plates mounted in said recesses and located so as to sweep a major portion of the wall of said article during rotation of said article before said inspection head, a common main capacitor plate arcuately formed and located adjacent the inspection head outwardly of the outer contour of said article, means for presenting and rotating said article before said inspection head and said main plate, means for maintaining said article in spaced relationship with said inspection head and main plate, electrical means associated with said main plate and said pickup plates to provide an electrostatic field therebetween, individual electrical means responsive to changes in capacitance of each of said pickup plates with respect to said common main plate caused by variations from a predetermined wall thickness of said article contiguous to each respective pickup plate, and normally inactive rejection means activated by any of said individual electrical means to separate defective from acceptable articles.

THEODORE C. BAKER.

REFERENCES CITED

The following references are of record in the file of this patent:

UNITED STATES PATENTS

| Number | Name | Date |
| --- | --- | --- |
| 2,070,339 | Moore | Feb. 9, 1937 |
| 2,270,613 | Young | Jan. 20, 1942 |
| 2,285,152 | Firestone | June 2, 1942 |
| 2,357,860 | Whitaker | Sept. 12, 1944 |
| 2,387,496 | Cornelius | Oct. 23, 1945 |
| 2,399,582 | Stevens | Apr. 30, 1946 |
| 2,407,062 | Darrah | Sept. 3, 1946 |